US006433737B2

(12) United States Patent
Katz

(10) Patent No.: US 6,433,737 B2
(45) Date of Patent: Aug. 13, 2002

(54) METHOD OF IMPROVING QUALITY OF RADIO CONNECTION

(75) Inventor: Marcos Katz, Oulu (FI)

(73) Assignee: Nokia Telecommunications Oy, Espoo (FI)

(*) Notice: Subject to any disclaimer, the term of this patent is extended or adjusted under 35 U.S.C. 154(b) by 0 days.

(21) Appl. No.: 09/859,415

(22) Filed: May 18, 2001

Related U.S. Application Data

(63) Continuation of application No. 09/341,095, filed as application No. PCT/FI98/00855 on Nov. 4, 1998, now Pat. No. 6,229,481.

(30) Foreign Application Priority Data

Nov. 5, 1997 (FI) .................................................. 974149
Mar. 19, 1998 (FI) .................................................. 980616

(51) Int. Cl.[7] ................................................ H04B 7/00
(52) U.S. Cl. ...................... 342/367; 455/69; 455/517; 455/562
(58) Field of Search ......................... 342/367; 455/507, 455/517, 562, 69

(56) References Cited

U.S. PATENT DOCUMENTS

| 5,861,844 A | 1/1999 | Gilmore et al. | ............. 342/374 |
| 6,023,607 A | 2/2000 | Siira | ........................ 455/25 |
| 6,108,323 A | 8/2000 | Gray | ........................ 455/562 |
| 6,229,481 B1 * | 5/2001 | Katz | ........................ 342/367 |

FOREIGN PATENT DOCUMENTS

| EP | 0 755 090 | 1/1997 |
| GB | 2 307 142 | 5/1997 |

OTHER PUBLICATIONS

Inoue et al, "A New Duplex Method for Integrated Voice/Data Wireless Communications", 4th IEEE Int'l Conf. on Universal Personal Communications, 11/95.*

* cited by examiner

Primary Examiner—Gregory C. Issing
(74) Attorney, Agent, or Firm—Pillsbury Winthrop LLP

(57) ABSTRACT

The invention relates to a method of improving the quality of a radio connection (170) in a cellular radio network. Relevant for the invention, the cellular radio network includes a base station system (126) and a subscriber terminal (150). A bidirectional radio connection (170) using a directional antenna beam (304) is provided between the base station system (126) and the subscriber terminal (150). In the method, in the base station system (126) an angle of incidence (302) of the directional antenna beam (304) is formed on the basis of a received radio signal (170A) transmitted by the subscriber terminal (150). The base station system (126) transmits a radio signal (170B) to the subscriber terminal (150) in the direction of an angle of departure (308) formed on the basis of the angle of incidence (302). In accordance with the invention, a ratio is formed for the imbalance between the downlink and uplink traffics. The processing of the directional antenna beam (304) of the radio signal (170A, 170B) is controlled on the basis of the formed ratio.

48 Claims, 5 Drawing Sheets

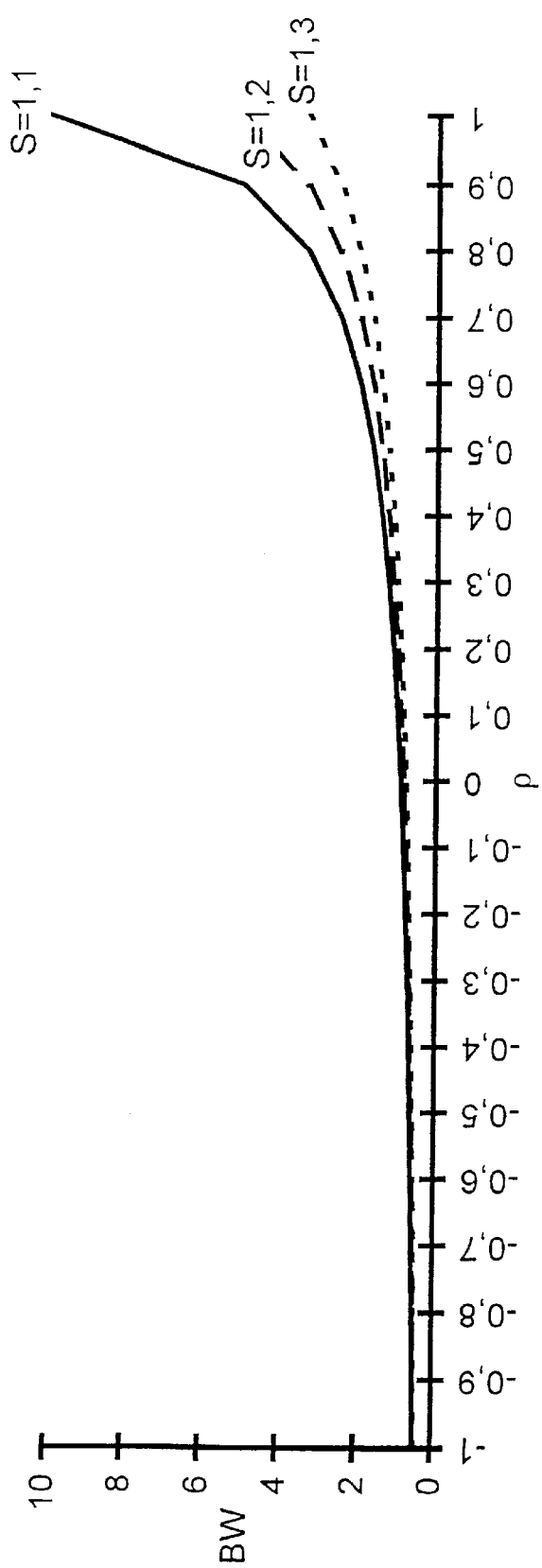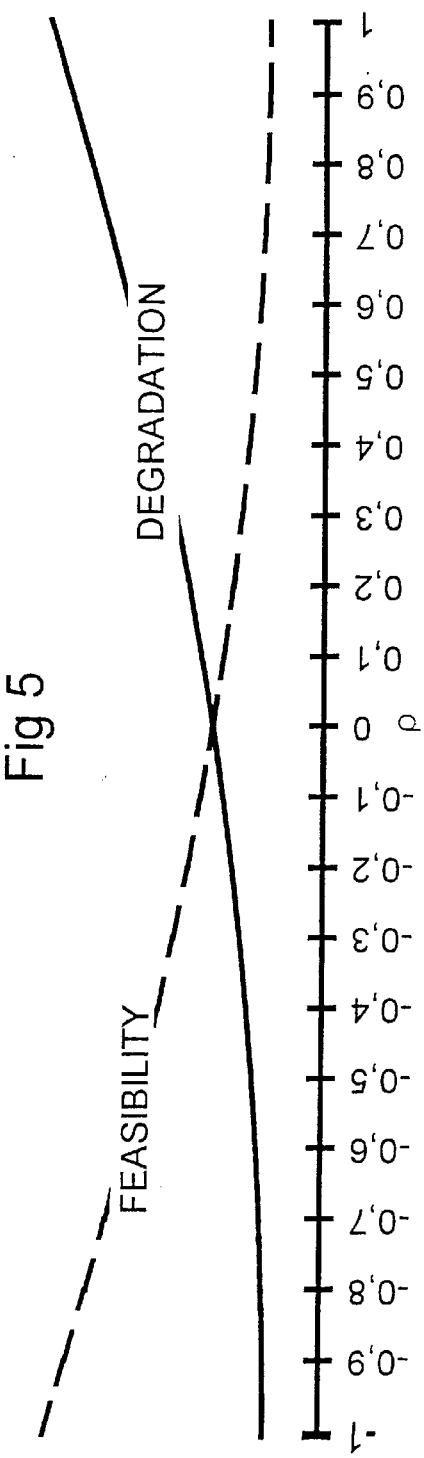

METHOD OF IMPROVING QUALITY OF RADIO CONNECTION

This application is a Continuation Application of U.S. application Ser. No. 09/341,095 filed Jul. 2, 1999, now U.S. Pat. No. 6,229,481 which is the National Phase of International Application PCT/FI98/00855 filed Nov. 4, 1998 which designated the U.S. and that International Application was Published under PCT Article 21(2) in English.

FIELD OF THE INVENTION

The invention relates to a method of improving the quality of a radio connection in a cellular radio network, comprising a base station system, a subscriber terminal and a bidirectional radio connection between the base station system and the subscriber terminal using a directional antenna beam; in which method in the base station system, an angle of incidence of the directional antenna beam is formed on the basis of a received uplink radio signal transmitted by the subscriber terminal, and the base station system transmits a radio signal on the downlink to the subscriber terminal in the direction of an angle of departure formed on the basis of the angle of incidence.

BACKGROUND OF THE INVENTION

A problem presented by the arrangement described above is that it functions most properly when the radio connection between the base station system and the subscriber terminal is balanced, in other words radio signals travel regularly and symmetrically in both directions. The problem in radio connections comprising sporadic and/or asymmetrical traffic is that, because a long time may have elapsed since the reception of a previous signal from the subscriber terminal, the angle of departure does not necessarily correspond to the actual location of the subscriber terminal. During this time, the subscriber terminal may have moved too much for the signal transmitted using the angle of departure formed on the basis of the old angle of incidence to reach the subscriber terminal. The properties of the channel used in the radio connection also change on account of the change in the location. A next signal received by using an out-of-date angle of incidence and transmitted by the subscriber terminal can also be lost.

The problem is serious particularly in cellular radio networks using packet transmission; in a typical packet transmission, one party, for example the base station system, transmits much data, and the subscriber terminal possibly only transmits occasional retransmission requests. The use of a WWW (World Wide Web) browser, for example, results in heavy traffic on the downlink and light traffic on the uplink.

BRIEF DESCRIPTION OF THE INVENTION

An object of the invention is thus to provide a method and equipment implementing the method so as to solve the above problems. This can be achieved by a method described in the introduction, which is characterized by forming a ratio for the imbalance between the downlink traffic and the uplink traffic; controlling the processing of the directional antenna beam of the radio signal on the basis of the ratio.

The invention further relates to a cellular radio network comprising a base station system, a subscriber terminal, and a bidirectional radio connection between the base station system and the subscriber terminal and using a directional antenna beam; and on the uplink, the base station system forms an angle of incidence of the directional antenna beam on the basis of a received radio signal transmitted by the subscriber terminal, and on the downlink, the base station system transmits a radio signal to the subscriber terminal in the direction of an angle of departure formed on the basis of the angle of incidence.

The cellular radio network of the invention is characterized in that the base station system is arranged to form a ratio for the imbalance between the downlink traffic and the uplink traffic, control the processing of the antenna beam of the radio signal on the basis of the ratio.

The preferred embodiments of the invention are disclosed in the dependent claims.

The invention is based on the idea that in the base station system, a ratio is formed between the amount of the traffic transmitted on the downlink and the amount of the traffic received on the uplink. By means of the ratio, problems occurring on the radio path can easily be predicted and avoided.

Several advantages can be achieved by the method and arrangement of the invention. The method enables directional antenna beams to be used in radio connections comprising sporadic and/or asymmetric traffic, particularly in packet radio systems. The method enables the most suitable algorithm for processing the directional radio beam to be selected for the situation.

BRIEF DESCRIPTION OF THE DRAWINGS

The invention is now described in closer detail in connection with the preferred embodiments with reference to the accompanying drawings, in which FIG. 5 shows an example of how the ratio and the width of an antenna beam depend on each other, and FIG. 6 illustrates how the ratio is used for selecting an algorithm for processing a directional radio beam.

DETAILED DESCRIPTION OF THE INVENTION

Figure 1:
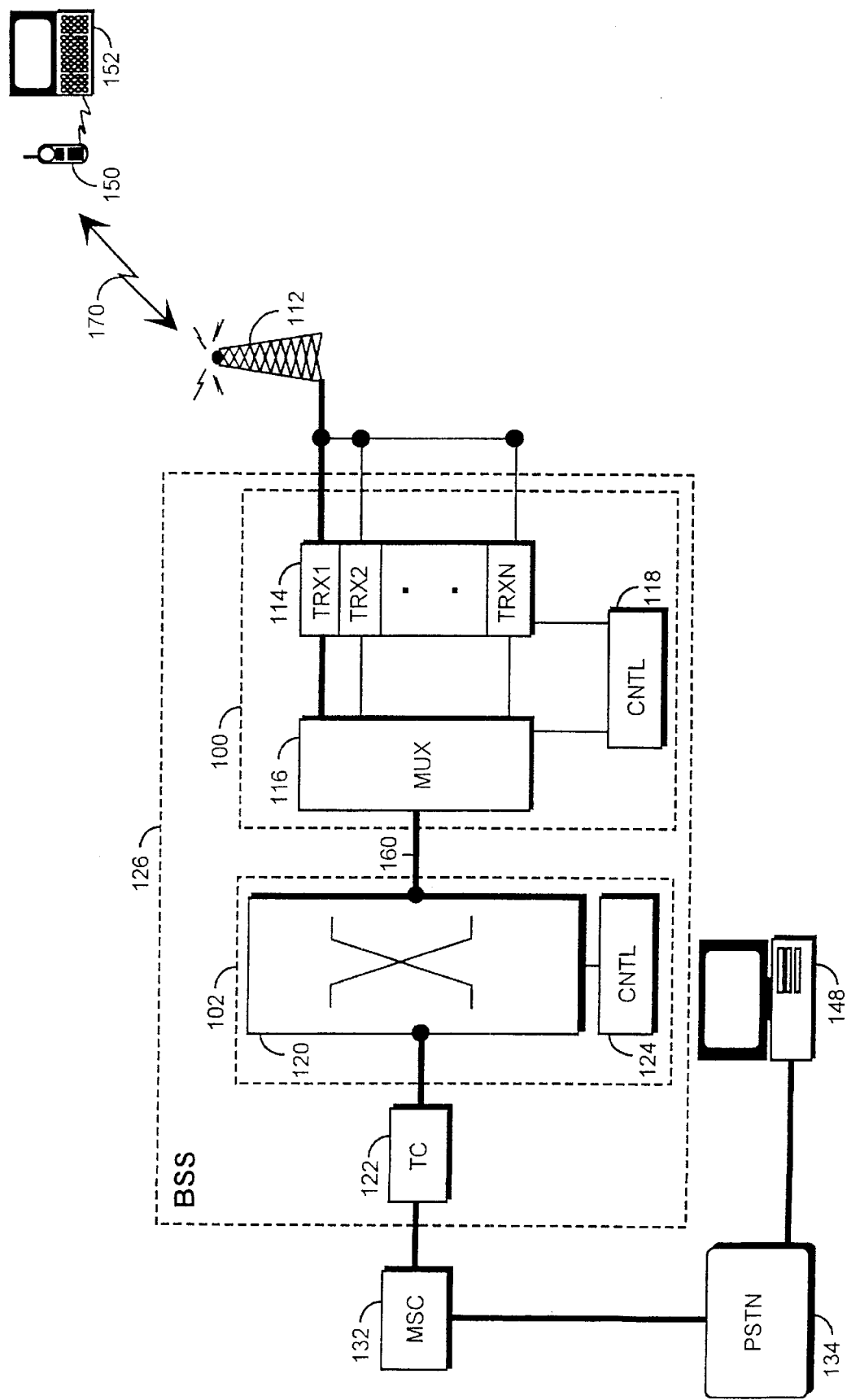
FIG. 1 shows an example of a cellular radio network in accordance with the invention.

With reference to FIG. 1, a typical structure of a cellular radio network in accordance with the invention is described. FIG. 1 only comprises matters that are relevant for describing the invention, but it is obvious to those skilled in the art that a common cellular radio network also comprises other functions and structures, which need not to be described here in closer detail. The invention is suitable for use in all kinds of cellular radio networks in which above problems occur caused by radio connections comprising sporadic and/or asymmetric traffic. The cellular radio networks of the invention use SDMA (Space Division Multiple Access) in the form of directional antenna beams. The antenna beams used can most readily be formed by beamforming techniques.

The example shows the use of the invention in a cellular radio network which uses TDMA (Time Division Multiple Access), without being restricted thereto, however. The invention can thus be used in cellular radio networks which use CDMA (Code Division Multiple Access) and FDMA (Frequency Division Multiple Access), for example, and in hybrid systems which use different multi-access systems simultaneously.

A cellular radio network typically comprises a fixed network infrastructure, in other words a network part, and subscriber terminals 150, which can be fixedly located, situated in a vehicle or portable terminals. The subscriber terminal 150 can be a common GSM mobile telephone to which a portable computer 152, for example, can be connected by an extension card, and which can be used in packet transmission for ordering and processing packets. The network part comprises base stations 100. A base station controller 102 connected to a plurality of base stations 100 controls them in a centralized manner. A base station 100 comprises transceivers 114. The base station 100 typically comprises one to sixteen transceivers 114. One transceiver 114 provides one TDMA frame, in other words typically eight time slots, with radio capacity.

The base station 100 comprises a control unit 118, which controls the operation of the transceivers 114 and a multiplexer 116. The traffic and control channels used by a plurality of transceivers 114 are placed in one transmission connection 160 by the multiplexer 116.

The transceivers 114 in the base station 100 are connected to an antenna array 112 by which a bi-directional radio connection 170 is established to the subscriber terminal 150.

Figure 2:
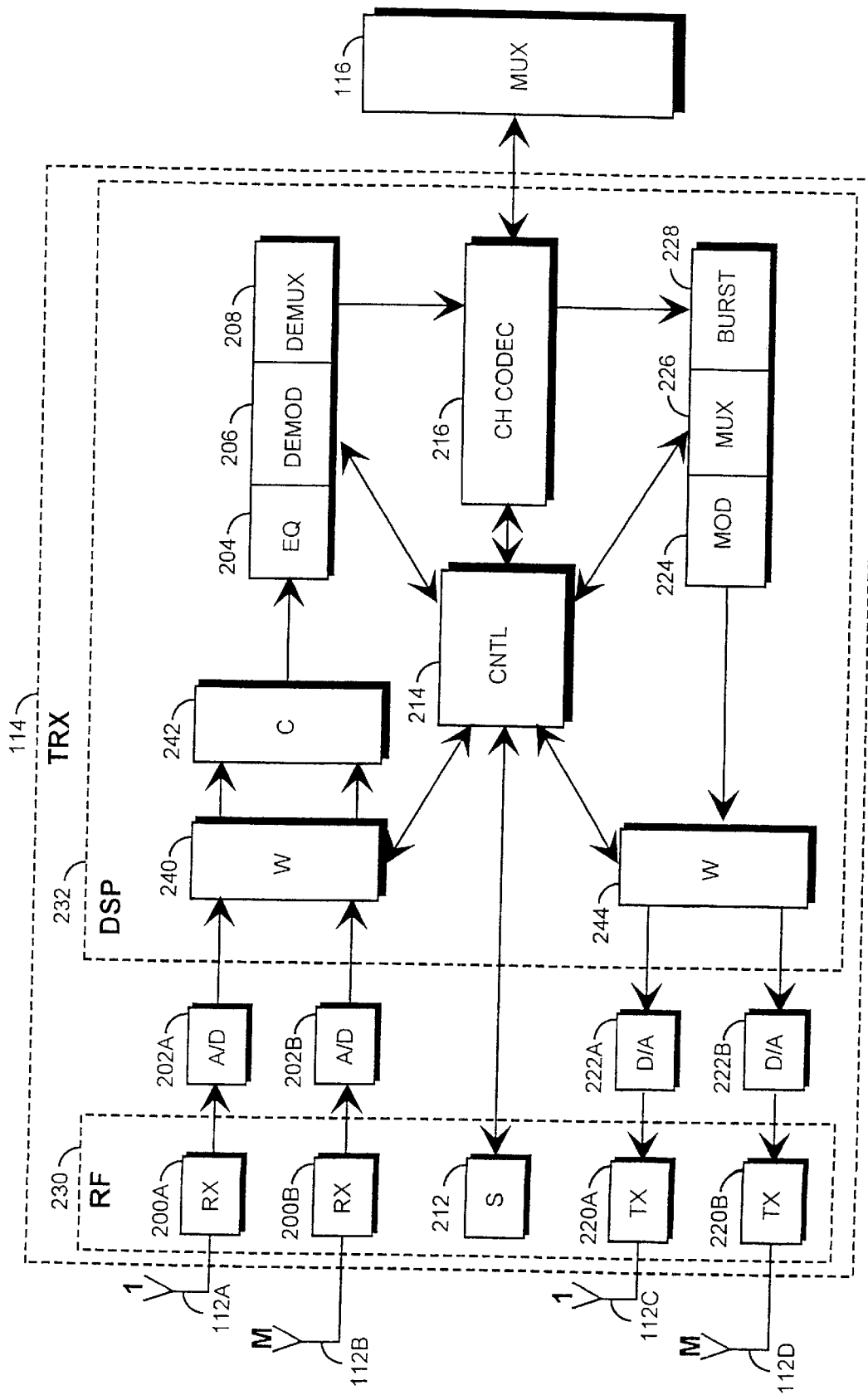
FIG. 2 shows a transceiver.

FIG. 2 shows in closer detail the structure of one transceiver 114. The antenna array using directional antenna beams comprises various separate elements 112A, 112B, such as eight different elements, to direct an antenna beam in reception. The number of the antenna elements 112A, 112B can be M, when M is any integer greater than 1. The same antenna elements 112A, 112B can be used in the transmission and in the reception, or alternatively, the transmission can use unique antenna elements 112C, 112D, as shown in FIG. 2. The arrangement of the antenna elements 112A, 112B, 112C, 112D can be linear or planar, for example.

Linearly, the elements can be arranged as ULA (Uniform Linear Array), for example, in which the elements are placed in a straight line at regular intervals. A planar arrangement, on the other hand, can be a CA (Circular Array) in which the elements are placed on the same plane horizontally in the form of the periphery of a circle, for example. A certain part of the periphery of the circle, for example 120 degrees, or even full 360 degrees, is then covered. The one-level antenna structures mentioned above can, in principle, also be implemented as two- or even three-dimensional structures. A two dimensional structure is formed by placing ULA structures in parallel, for example, whereby the elements form a matrix.

A multipath-propagated signal is received via the antenna elements 112A, 112B. Each antenna element 112A, 112B has a unique receiver 200A, 200B, which are radio frequency parts 230.

A receiver 200 comprises a filter, which blocks frequencies outside a desired frequency band. Next, the signal is converted into intermediate frequency or directly into baseband, and in this form the signal is sampled and quantized in an analogue/digital converter 202A, 202B.

The multipath-propagated signals presented in a complex form are next conveyed to a digital signal processing processor 232 with its programs. The antenna pattern of the received signal is directed by digital phasing of the signal, so the antenna elements 112A, 112B do not have to be mechanically steerable. Hence, the direction of the subscriber terminal 150 is expressed as a complex vector which is formed by elementary units corresponding to each antenna element 112A, 112B and usually expressed as complex numbers. Each separate signal is multiplied by the elementary unit of the antenna element in weighting means 240. Next, the signals can be combined in combining means 242.

Signal phasing can also be performed to a radio-frequency signal or an intermediate-frequency signal possibly used. The weighting means 240 are then located in connection with the radio frequency parts 230 or between the radio frequency parts 230 and the analogue/digital converters 202A, 202B.

Beamforming can also be performed analogically; the width of the beams is then usually fixed. Using a Butler matrix, eight different beams can be formed in the base station 100 sectored into three sectors. If the width of each sector of the base station 100 is 120 degrees, so the width of a single beam is 15 degrees. The width of the beam can thus be adjusted by using one or more beams, whereby the width of the overall beam increases in steps of 15 degrees. In an extreme case, an omnidirectional antenna can be achieved when all beams of all sectors are used for forming a directional antenna beam. A base station system 126 can simultaneously support different algorithms for forming the antenna beam.

An equalizer 204 compensates for interference, such as interference caused by multipath propagation. A demodulator 206 derives a bit stream which is conveyed to a demultiplexer 208 from the equalized signal. The demultiplexer 208 separates the bit stream from the different time slots into its unique, logical channels. A channel codec 216 decodes the bit stream of the different logical channels, in other words decides whether the bit stream is signaling information, which is conveyed to a control unit 214, or whether the bit stream is speech, which is conveyed to a speech codec 122 of a base station controller 102. The channel codec 216 also performs error correction. The control unit 214 performs internal control tasks by controlling the different units.

In the transmission, a burst generator 228 adds a training sequence and a tail to the data supplied from the channel codec 216. A multiplexer 226 assigns a unique time slot to each burst. The signal is multiplied in weighting means 244 by an elementary unit corresponding to each antenna element. In digital phasing, the antenna beam can thus be directed in the direction of the complex vector formed by the elementary units.

A modulator 224 modulates the digital signals into a radiofrequency carrier wave. By using a digital/analogue converter 222A, 222B, the signal is converted from digital into analogue. Each signal component is conveyed to a transmitter 220A, 220B corresponding to each antenna element.

The transmitter 220A, 220B comprises a filter to restrict the bandwidth. Furthermore, the transmitter 220A, 220B controls the output capacity of the transmission. A synthesizer 212 arranges necessary frequencies for the different units. The synthesizer 212 comprises a clock which can be controlled locally, or it can be controlled in a centralized manner from somewhere else, for example from the base station controller 102. The synthesizer 212 generates the necessary frequencies by a voltage-controlled oscillator, for example.

The base station controller 102 comprises a group switching field 120 and a control unit 124. The group switching field 120 is used for connecting speech and data, and for combining signaling circuits. The base station system 126 formed by the base station 100 and the base station controller 102 further comprises the transcoder 122. The transcoder is usually located as near to a mobile switching centre 132 as possible since speech can then be transmitted in the form of a cellular radio network between the transcoder 122 and the base station controller 102 using as little transmission power as possible.

The transcoder 122 converts the different digital forms of speech coding used between a public switched telephone network and the cellular radio network into compatible ones, for example from the mode of 64 kbit/s of the fixed network to another mode (for example of 13 kbit/s) of the cellular radio network, and vice versa. The control unit 124 performs call control, mobility management, collection of statistical information and signaling.

As can be seen from FIG. 1, the group switching field 120 enables connections (depicted by the black dots) to a public switched telephone network (PSTN) 134 to be established via the mobile switching centre 132. In the public switched telephone network, a typical terminal 136 is a common telephone or an integrated services digital network (ISDN) telephone.

The invention is preferably implemented by software, whereby the invention requires program modifications in a precisely defined area in the control unit 118 of the base station 100 and/or in the software of the digital signal processing processor of the transceiver 114. The necessary modifications can thus be located differently, depending on how the different programs with their functions and responsibilities have been assigned between the different parts of the base station system 126.

The bold line in FIG. 1 depicts how the data to be transmitted travels from the subscriber terminal 150 in the cellular radio network to a computer 148 connected to the public switched telephone network. The data travels through the system on an air interface 170, from the antenna 112 to a first transceiver TRX1 114 and then, multiplexed in the multiplexer 116, over the transmission connection 160 to the group switching field 120 in which a connection is provided to the output of the transcoder 122, and from the transcoder 122 the data is conveyed over the public switched telephone network 134 to the computer 148. In the data transmission, however, transcoding is not performed in the transcoder 122, since this would change the contents of the data transmitted.

Figure 3B:
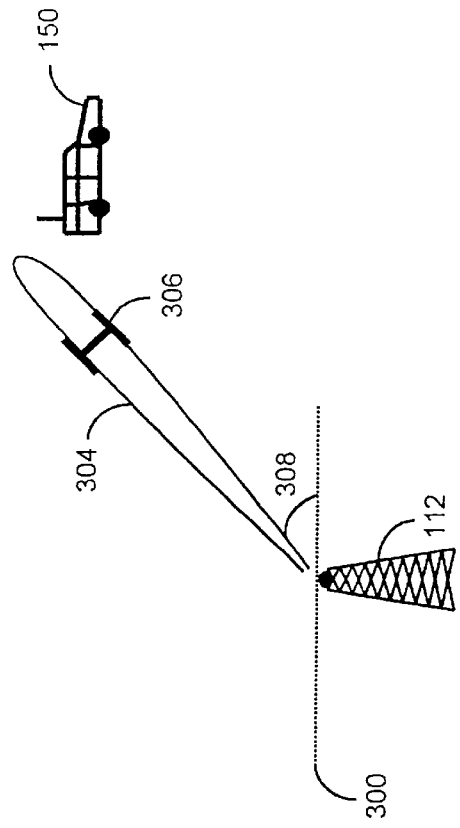
FIGS. 3A, 3B show known antenna beams.
Figure 3D:
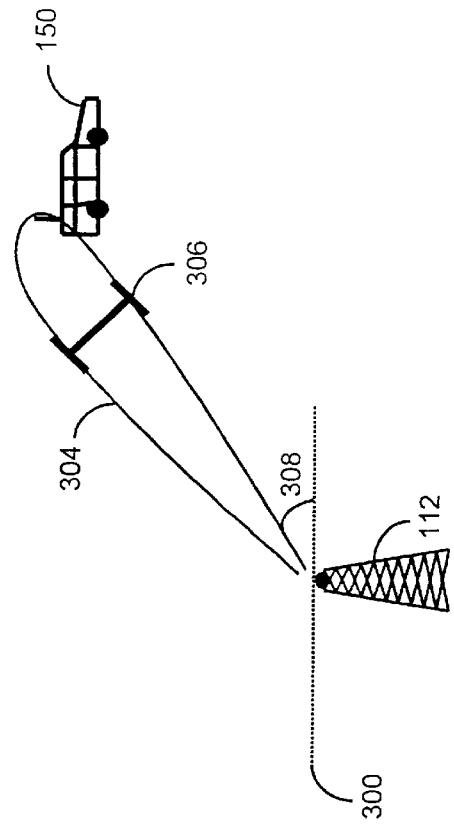
FIGS. 3C, 3D show antenna beams of the invention.
Figure 3A:
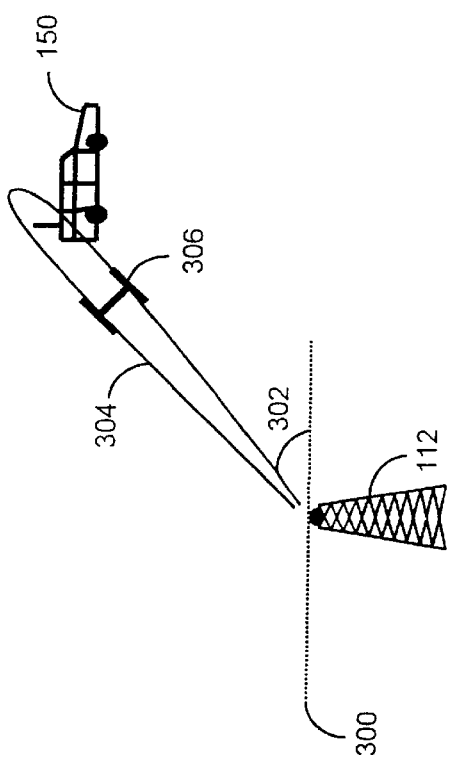

FIG. 3A depicts how the signal is received from the subscriber terminal 150. The base station system 126 knows in which direction the subscriber terminal 150 is located (known as Direction of Arrival). In the GSM system, for example, this information is formed by utilizing the known training sequence included in the received signal. Similarly, in the CDMA systems, the location can be inferred on the basis of a received pilot signal. Furthermore, "blind" estimating methods, which do not require the received signal to include any known parts, can also be used. The methods compute the direction from which the strongest signal is received. The location of the subscriber terminal 150 can also be found out in some other way. For the antenna array 112, the direction is expressed as an angle 302 with respect to the geographical west-east axis 300. The radio signal is received from the subscriber terminal 150 via the antenna array 112 by using a directional antenna beam 304.

FIG. 3B depicts how the subscriber terminal 150 has moved during the packet transmission, but the base station system 126 has not been informed of this. An angle of departure 308, which is used in the transmission for directing the antenna beam 304 and formed on the basis of the angle of incidence 302, is based on out-of-date information about the location of the subscriber terminal 150. Consequently, the antenna beam 304 is no longer directed towards the subscriber terminal 150, and the quality of the connection degrades; the connection may even be interrupted.

In the transmission, the base station system 126 can control the following transmission parameters: the angle of departure 308 of the directional antenna beam 304, the width 306 of the directional antenna beam 304, and the transmission power of the radio signal. A suitable combination of these parameters yields an optimum result.

Typically, when speech is transmitted, the amount of traffic is almost identical on the downlink and the uplink, provided that discontinuous transmission is not used.

When data is transmitted, the traffic is seldom balanced, since the aim is usually to transmit information from one point to another, for example transmission of data files, and searching databases for information. Packet transmission is usually used for real-time and non-real-time data transmission, although it can also be used for real-time speech transmission.

When the traffic to be transmitted has grown heavier on the downlink than on the uplink, the base station system 126 has fewer opportunities to receive uplink radio signals, respectively. The more irregularly bursts are received from the uplink, or the smaller the amount of the bursts received from the uplink, which contain the training sequence, the poorer the outcome of channel estimation and the algorithm for forming the directional antenna beam. Consequently, the downlink transmission parameters may not meet the requirements set by the situation.

When the traffic is heavier on the uplink than on the downlink, the accuracy of the channel estimates is good, and the algorithm for forming the directional antenna beam is good both in the transmission and reception.

In accordance with the invention, a ratio is formed for the imbalance between the downlink traffic and the uplink traffic. The ratio is then used for controlling the processing of the directional antenna beam 304 of the radio signal.

The ratio is formed by the following formula:

$$\rho(T_m) = \frac{NB_D - NB_U}{NB_U + NB_D} \quad (1)$$

In the formula, the ratio $\rho$ indicates the imbalance between the amount of traffic on the downlink and on the uplink over a given period of time $T_m$ in the past. In the formula, $NB_D$ represents the amount of traffic on the downlink, the number of radio bursts, for example, and $NB_U$ represents the amount of traffic on the uplink, respectively. Hence, in formula 1, the ratio $\rho$ is obtained by subtracting from the number $NB_D$ of the signals transmitted on the downlink during a given period of time, the number $NB_U$ of the signals received on the uplink during the same given period of time, and by dividing the difference thus obtained by the sum of the number $NB_D$ of the signals transmitted on the downlink and the number $NB_U$ of the signals received on the uplink, said sum being formed using the same parameters that were used for forming said difference.

The length of the time period $T_m$ depends on the circumstances in the cellular radio network, mobility of the users, and the distance between the base station 100 and the subscriber terminal 150, etc. The length of the time period $T_m$ can be controlled dynamically, for example, depending on the above parameters. The time period $T_m$ can also be determined by measurements, until a predetermined standard of quality is met.

By examining formula 1, it can be stated that when the ratio $\rho(T_m)$ obtains a value of about zero, the traffics are balanced. When the ratio $\rho(T_m)$ obtains a value greater than zero, the traffics are unbalanced in such a manner that the downlink traffic is heavier than the uplink traffic. When the ratio $\rho(T_m)$ obtains a value lower than zero, the traffics are unbalanced in such a manner that the uplink traffic is heavier than the downlink traffic. When the ratio $\rho(T_m)$ obtains a value 1, only the downlink has traffic. When the ratio $\rho(T_m)$ obtains a value −1, only the uplink has traffic.

In the transmission, the forming of the directional antenna beam 304 of the radio signal transmitted to the subscriber terminal 150 by the base station system 126 can be controlled on the basis of the ratio $\rho(T_m)$. Also in the reception, the processing of the directional antenna beam 304 of the radio signal received by the base station system 126 from the subscriber terminal 150 can be controlled on the basis of the ratio. In the cellular radio network, the invention can thus be utilized in both transmission directions, or alternatively, only in one of them. The use of the invention does not, of course, exclude the use of other methods, but it can be used together with different methods using directional antenna beams.

FIG. 6 illustrates how the choice of the algorithm for processing the directional antenna beam is influenced by different values of the ratio $\rho(T_m)$. In the figure, the potential values of the ratio $\rho(T_m)$ from −1 to 1 are shown on the x-axis. A curve FEASIBILITY depicts the feasibility of the directional antenna beam for the circumstances. The greater the value the curve FEASIBILITY obtains on the y-axis, the more appropriate it is to use the directional antenna beam. A curve DEGRADATION depicts how the performance of the directional antenna beam degrades in the circumstances, respectively. The greater the value the curve DEGRADATION obtains on the y-axis, the poorer the performance of the directional antenna beam.

It was mentioned above that the controllable transmission parameters include the transmission power, the angle of departure 308 of the directional antenna beam 304 and the width 306 of the directional antenna beam 304. The angle of incidence of the directional antenna beam 304 and the width 306 of the directional antenna beam 304 can be controlled in the reception.

The width 306 of the directional antenna beam 304 either in the transmission or in the reception can be determined on the basis of the ratio $\rho(T_m)$ by using the formula:

$$BW = \frac{G}{S - \rho(T_m)} \quad (2)$$

In formula 2, a parameter BW represents the width 306 of the directional antenna beam 304, a parameter G is the proportionality constant, S is a sensitivity parameter whose value varies depending on the situation, always being greater than 1, however, and a parameter $\rho(T_m)$ is the ratio computed on the basis of formula 1. The width BW of the antenna beam directed in accordance with formula 2 depends on a formula in which the proportionality constant G is divided by a difference which is formed by subtracting the ratio $\rho(T_m)$ from the sensitivity parameter S which is greater than 1.

FIG. 5 illustrates how the width BW of the directional antenna beam depends on the ratio $\rho(T_m)$. The potential values of the ratio $\rho(T_m)$ from −1 to 1 are shown on the x-axis, and the width BW of the directional antenna beam is shown on the y-axis. The value of the proportionality constant G is set to be 1, and the sensitivity parameter S is given three different values 1.1 and 1.2 and 1.3 by turns. The continuous line represents the curve corresponding to the sensitivity parameter value 1.1, the broken line represents the curve corresponding to the value 1.2, and the dotted line represents the curve corresponding to the value 1.3.

It can be seen from FIG. 5 that when the ratio $\rho(T_m)$ approaches the value 1, a wider directional antenna beam BW is formed. When the ratio $\rho(T_m)$ approaches a value −1, a narrower directional antenna beam is formed, respectively. When the traffic is balanced, the ratio $\rho(T_m)$ obtains a value zero, and the width of the directional antenna beam is determined by the choice of the proportionality constant G, since formula 2 then obtains the form BW=G/S.

The width of the directional antenna beam can be determined by using formula 2 alone, or alternatively, formula 2 can be only one of the control variables affecting the width of the directional antenna beam. Using formula 2, the uncertainty of the uplink estimation can, in principle, be compensated for by widening the directional antenna beam used.

FIG. 5 illustrates how the sensitivity parameter S affects the width BW of the directional antenna beam: the nearer the value of the sensitivity parameter S is to 1, the more sensitive the width of the directional antenna beam is to change when traffic imbalance increases. It can also be seen from FIG. 5 that within the value range from −1 to zero of the proportionality constant $\rho(T_m)$, in other words when the traffic is heavier on the uplink, the width of the directional antenna beam is almost identical, in other words it is extremely narrow. This is due to the fact that the base station system 126 receives a sufficient amount of information from the subscriber terminal 150, and thus can reliably utilize the algorithms for forming the directional antenna beam. The simplest way to choose the algorithm for forming the directional antenna beam is to use a narrow directional antenna beam within the value range from −1 to zero of the ratio $\rho(T_m)$, to start increasing the width of the directional antenna beam within the value range above zero, and to stop using the directional antenna beam, and possibly even use an omnidirectional antenna, when approaching a value 1.

Instead of for controlling the width of the directional antenna beam, formula 2 can also be used for indicating a degradation of performance of the directional antenna beam, which is caused by insufficient traffic on the uplink, as was shown in connection with FIG. 6. This value can be observed in FIG. 5 by replacing the control BW of the width of the antenna beam on the y-axis by a parameter called "degradation of performance of the directional antenna beam".

Figure 3C:
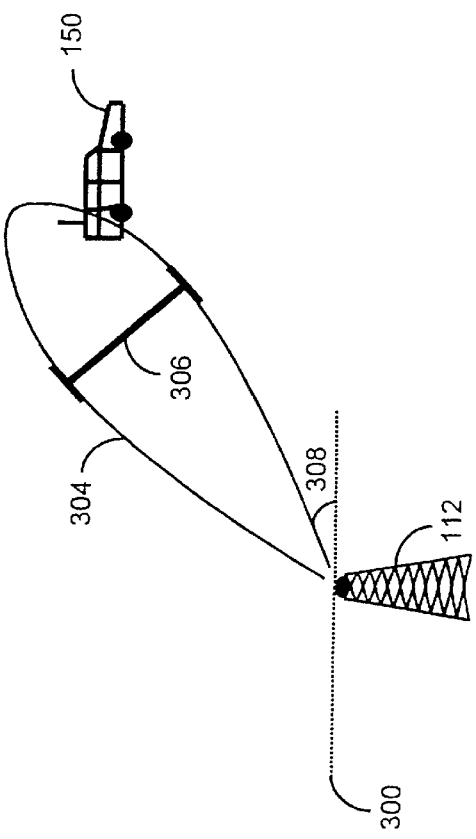

FIG. 3C illustrates the operation of the invention. The subscriber terminal has moved from the situation of FIG. 3A as described in FIG. 3B. The directional antenna beam 304 of the invention has now been widened since the ratio $\rho(T_m)$ has become greater than zero.

According to a preferred embodiment of the invention, the width 306 of the directional antenna beam 304 of the radio signal used by the base station system 126 in the radio connection 170 further directly depends on the uncertainty time elapsed between the formation of a last angle of incidence and the use of the radio signal because such a long time has elapsed since the location of the subscriber terminal 150 was last estimated that the subscriber terminal 150 has probably moved. For example, by comparing FIGS. 3A and 3C it can be seen that the width 306 of the directional antenna beam 304 has increased to cover the assumed movement of the subscriber terminal 150 in FIG. 3C and the quality of the connection does not degrade.

The example of FIGS. 3A, 3C also applies to the received signal in the base station system 126. The antenna pattern of the signal received by the antenna array 112 can be directed in the assumed direction of the subscriber terminal 150. The antenna beam 304 is widened in the reception to enable also the strongest signals to be received. The width of the beam 304 can slightly (by some degrees) be affected by changing the values of the elementary units of the directional vector, but most efficiently it can be affected by adjusting the number of the antenna elements 112A, 112B used. The fewer elements 112A, 112B are used, the wider the beam 304 is. The more elements 112A, 112B are used, the narrower the beam 304 can be, respectively. When analogue beamforming techniques are used, the adjustment of the width of the beam 304 is quantized, whereby it can be adjusted step by step, in steps of fifteen degrees, for example, by increasing or decreasing the number of the partial beams of the beam 304.

Figure 4A:
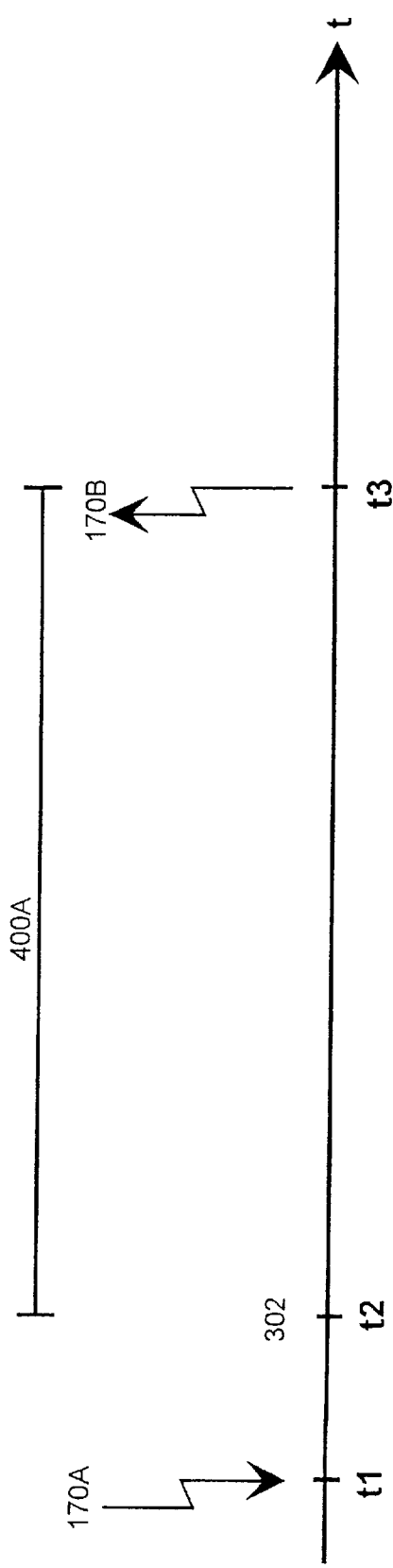
FIGS. 4A, 4B illustrate the conception of uncertainty time.

FIG. 4A illustrates the concept of uncertainty time. A radio signal 170A transmitted by the subscriber terminal 150 has been received at a point of time t1 in the base station system 126. At a point of time t2, the angle of incidence 302 indicating the direction towards the subscriber terminal 150 is formed on the basis of the received radio signal 170A. At a point of time t3, the base station system 126 transmits a radio signal 170B in the direction of the angle of departure 308 formed on the basis of the angle of incidence 302. An uncertainty time 400A is now the time that has elapsed between the point of time when the direction of the subscriber terminal 150 was last estimated and the point of time when the signal is transmitted in the estimated direction of the subscriber terminal 150. The longer the uncertainty time 400A becomes, the more improbable it is that the subscriber terminal 150 is located in the original direction.

Figure 4B:
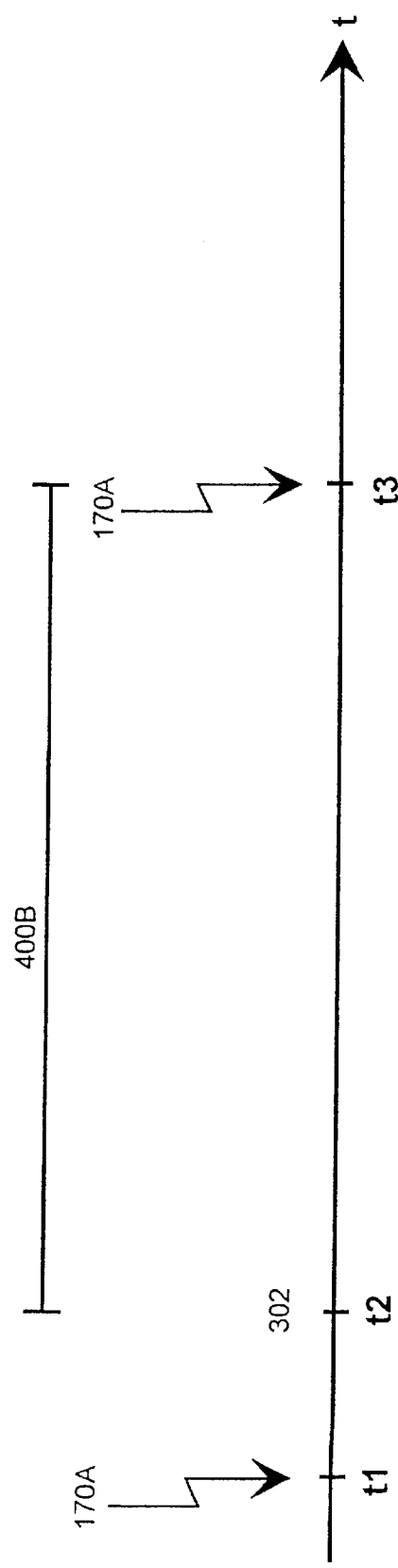

Similarly, FIG. 4B illustrates the uncertainty time with respect to the reception. Again, the radio signal 170A transmitted by the subscriber terminal 150 has been received at the point of time t1. At the point of time t2, the angle of incidence 302 indicating the direction towards the subscriber terminal 150 is formed on the basis of the received radio signal 170A. At the point of time t3, the base station system 126 receives a next signal 170A transmitted by the subscriber terminal 150 using as the direction of the antenna beam 304 the angle of incidence 302 estimated at the point of time t2. An uncertainty time 400B is now the time that has elapsed between the point of time when the direction of the subscriber terminal 150 was last estimated and the point of time when the signal is received from the estimated direction of the subscriber terminal 150. The longer the uncertainty time 400B becomes, the more improbable it is that the subscriber terminal 150 is located in the original direction.

In the base station system 126, the width 306 of the antenna beam 304 is thus increased according to the uncertainty time in the transmission and/or the reception. The dependence can be linear or in accordance with any other increasing function. The width 306 of the antenna beam 304 can be changed steplessly or in predetermined steps.

FIG. 3D shows a preferred embodiment in which the width 306 of the antenna beam 304 is increased only in the direction of the assumed movement of the subscriber terminal 150. The direction of the movement can be estimated on the basis of the previous locations of the subscriber terminal 150. This has the advantage that the antenna beam 304 is not unnecessarily widened.

The width 306 of the antenna beam 304 preferably described is, in addition to the uncertainty time, also affected by the distance between the base station system 126, more specifically its antenna array 112, and the subscriber terminal 150. When this distance is short, and when the subscriber terminal 150 moves even for a relatively short period of time, a change of dozens of degrees in its direction results, seen from the antenna ar ray 112. When the distance is long, the change of the angle is typically only a few degrees, respectively. The dependence can be implemented for example in such a manner that the width 306 of the antenna beam 304 increases when the uncertainty time increases, but how much it increases depends on the distance between the base station system 126 and the subscriber terminal 150 in such a manner that when the distance is short, the width increases greatly, and decreases when the distance becomes longer.

In a preferred embodiment of the invention, in addition to or instead of the uncertainty time described above, the width 306 of the directional antenna beam 304 is affected by the properties of the channel of the radio connection 170. In the base station system 126, the channel of the radio connection 170 is estimated by utilizing the known part, the training sequence for example, included in the signal. When the channel quality is poor, the antenna beam 304 can be widened in order to improve the quality. A linear relation, for example, can be defined between the quality standards or other properties of the channel and the width of the beam 304.

Although the subscriber terminal 150 does not move at all, the channel may be changed in some circumstances. The quality of the channel can then be restored to an adequately high level by widening the beam 304. Let us assume a situation, for example, in which the subscriber terminal 150 is placed in a car. The quality of the radio connection 170 is extremely high since the subscriber terminal has a direct visual connection to the antenna 112 of the base station 100. A very narrow and precisely directed antenna beam 304 is then used. Next, a truck moves in front of the car, blocking the direct visual connection to the antenna 112. Consequently, the quality of the radio connection 170 degrades, which is detected in the base station system 126 in connection with channel estimation. By widening the directional antenna beam 304 the quality of the radio connection 170 can be restored to the former level. This is partly affected by the multipath propagation of the signal.

If a long time has elapsed since the channel estimation performed on the basis of the received signal, the width 306 of the antenna beam 304 can directly depend on the time elapsed between the channel estimation of the radio connection 170 performed on the basis of the previous received radio signal transmitted by the subscriber terminal 150 and the use of the radio signal. In principle, this corresponds to the main embodiment of the invention, but instead of the formation of the angle of incidence, the determining factor is now the length of the time elapsed since channel estimation.

Although the invention is described above with reference to the example in accordance with the accompanying drawings, it is obvious that the invention is not restricted thereto but it can be modified in many ways within the scope of the inventive idea disclosed in the attached claims.

What is claimed is:

1. A method of improving the quality of a radio connection in a cellular radio network including a base station system, a subscriber terminal, and a bi-directional radio connection between the base station system and the subscriber terminal using a directional antenna beam, the method comprising:
   receiving, by the base system, uplink traffic of the bi-directional radio connection transmitted by the subscriber terminal;
   transmitting, by the base station system, downlink traffic of the bi-directional radio connection to the subscriber terminal;
   forming a ratio for imbalance between the downlink traffic and the uplink traffic; and
   controlling processing of the directional antenna beam on a basis of the ratio.

2. The method of claim 1, wherein the transmitting downlink traffic comprises controlling a forming of the directional antenna beam on the basis of the ratio.

3. The method of claim 1, further comprising controlling processing of the directional antenna beam of the bi-directional radio connection received by the base station system from the subscriber terminal on the basis of the ratio.

4. The method of claim 1, wherein the ratio is formed by subtracting a number of signal received on the uplink traffic during a period of time from a number of signals transmitted on the downlink during that given period of time; and
   dividing a difference thus obtained by a sum of the number of signals transmitted on the downlink traffic and the number of signals received on the uplink traffic, the sum being formed using the number of signals received on the uplink traffic and the number of signals transmitted on the downlink traffic that were used for forming the difference.

5. The method of claim 4, wherein when the ratio obtains a value of about zero, the traffics are deemed balanced.

6. The method of claim 4, wherein when the ratio obtains a value greater than zero, the traffics are deemed unbalanced in such a manner that the downlink traffic is heavier than the uplink traffic.

7. The method of claim 4, wherein when the ratio obtains a value lower than zero, the traffics are deemed unbalanced in such a manner that the uplink traffic is heavier than the downlink traffic.

8. The method of claim 4, wherein when the ratio obtains a value 1, only the downlink traffic has traffic.

9. The method of claim 4, wherein when the ratio obtains a value −1, only the uplink traffic has traffic.

10. The method of claim 1, further comprising selecting a suitable algorithm for forming the directional antenna beam on the basis of the ratio.

11. The method of claim 1, wherein a width of the directional antenna beam is determined on the basis of the ratio.

12. The method of claim 11, wherein the width of the directional antenna beam depends on an equation in which a proportionality constant is divided by a difference, which difference is formed by subtracting the ratio from a sensitivity parameter which is greater than one.

13. The method of claim 11, wherein the width of the directional antenna beam of the bi-directional radio connection used by the base station system directly depends on an uncertainty time elapsed between a formulation of a last angle of incidence and a use of the bi-directional radio connection.

14. The method of claim 13, wherein the width of the directional antenna beam of the bi-directional radio connection transmitted by the base station system to the subscriber terminal directly depends on the uncertainty time elapsed between the formation of the last angle of incidence and a transmission moment.

15. The method of claim 13, wherein the width of the directional antenna beam of the bi-directional radio connection received by the base station system from the subscriber terminal directly depends on the uncertainty time elapsed between the formation of the last angle of incidence and a reception moment.

16. The method of claim 13, wherein the width of the directional antenna beam is increased in a direction of movement of the subscriber terminal.

17. The method of claim 13, wherein the width of the directional antenna beam of the bi-directional radio connection used by the base station system directly depends on the channel of the radio connection established on a basis of a preceding radio signal received or transmitted by the subscriber terminal.

18. The method of claim 13, wherein the width of the directional antenna beam of the bi-directional radio connection used by the base station system directly depends on a time elapsed between a channel estimation of the radio connection performed on a basis of a preceding radio signal or transmitted by the subscriber terminal, and a use of the bi-directional radio connection.

19. The method of claim 13, wherein the dependence on the uncertainty time is linear or in accordance with any other increasing function.

20. The method of claim 13, wherein the width of the directional antenna beam is changed in predetermined steps.

21. The method of claim 13, wherein the width of the directional antenna beam is changed steplessly.

22. The method of claim 13, wherein the width of the directional antenna beam is inversely affected by a distance between the base station system and the subscriber terminal.

23. The method of claim 13, wherein the method is used in bi-directional radio connections comprising at least one of sporadic and asymmetric traffic.

24. The method of claim 23, wherein the method is used in connection with packet transmission.

25. A cellular radio network comprising:
   a base station system;
   a subscriber terminal; and
   a bi-directional radio connection between the base station system and the subscriber terminal using a directional antenna beam,
   wherein the base station system is configured to receive uplink traffic of the bi-directional radio connection transmitted by the subscriber terminal, and the base station system is configured to transmit downlink traffic of the bi-directional radio connection to the subscriber terminal, and wherein the base station system is configured to form a ratio for an imbalance between the downlink traffic and the uplink traffic, and
   the base station is configured to control processing of the directional antenna beam of the transmitted or received bi-directional radio connection on a basis of the ratio.

26. The cellular radio network of claim 25, wherein the base station system is configured to form, on the basis of the ratio, the directional antenna beam of the bi-directional radio connection to be transmitted to the subscriber terminal.

27. The cellular radio network of claim 25, wherein the base station system is configured to form, on the basis of the ratio, the directional antenna beam of the bi-directional radio connection received from the subscriber terminal.

28. The cellular radio network of claim 25, wherein the base station system is configured to form the ratio by subtracting a number of signals received on the uplink traffic during a given period of time from a number of signals transmitted on the downlink traffic during that given period of time; and dividing the difference thus obtained by a sum of the number of signals transmitted on the downlink traffic and the number of signals received on the uplink traffic, the sum being formed using the number of signals received on the uplink traffic and the number of signals transmitted on the downlink traffic that were used for forming the difference.

29. The cellular radio network of claim 28, wherein when the ratio obtains a value of about zero, the traffics are deemed balanced.

30. The cellular radio network of claim 28, wherein when the ratio obtains a value greater than zero, the traffics are deemed unbalanced in such a manner that the downlink traffic is heavier than the uplink traffic.

31. The cellular radio network of claim 28, wherein when the ratio obtains a value lower than zero, the traffics are deemed unbalanced in such a manner that the uplink traffic is heavier than the downlink traffic.

32. The cellular radio network of claim 28, wherein when the ratio obtains a value of 1, only the downlink traffic has traffic.

33. The cellular radio network of claim 28, wherein the ratio obtains a value of −1, only the uplink traffic has traffic.

34. The cellular radio network of claim 25, wherein the base station system is configured to select a suitable algorithm for forming the directional antenna beam on the basis of the ratio.

35. The cellular radio network of claim 25, wherein the base station system is configured to determine a width of the directional antenna beam on the basis of the ratio.

36. The cellular radio network of claim 35, wherein the base station system is configured in such a manner that the width of the directional antenna beam depends on an equation in which a proportionality constant is divided by a difference, which difference is formed by subtracting the ratio from a sensitivity parameter which is greater than one.

37. The cellular radio network of claim 35, wherein the base station system is configured to form the width of the directional beam of the bi-directional radio connection to be directly dependent on an uncertainty time elapsed between a formation of a last angle of incidence and a use of the bi-directional radio connection.

38. The cellular radio network of claim 37, wherein the base station system is configured to form a width of the directional antenna beam of the bi-directional radio connection to be transmitted to the subscriber terminal to be directly dependent on the uncertainty time elapsed between the formation of the last angle of incidence and a transmission moment.

39. The cellular radio network of claim 37, wherein the base station system configured to form the width of the directional antenna beam of the bi-directional radio connection received from the subscriber terminal to be directly dependent on the uncertainty time elapsed between the formation of the last angle of incidence and a reception moment.

40. The cellular radio network of claim 37, wherein the base station system is configured to increase the width of the directional antenna beam in a direction of movement of the subscriber terminal.

41. The cellular radio network of claim 37, wherein the base station system is configured to form the width of the directional antenna beam of the bi-directional radio connection used by the base station system to be directly dependent on a channel of the radio connection established on a basis of a preceding radio signal received or transmitted by the subscriber terminal.

42. The cellular radio network of claim 37, wherein the base station system is configured to form the width of the directional antenna beam of the bi-directional radio connection used by the base station system to be directly dependent on a time elapsed between a channel estimation of the radio connection performed on a basis of a preceding radio signal received or transmitted by the subscriber terminal, and a use of the bi-directional radio connection.

43. The cellular radio network of claim 37, wherein the dependence on the uncertainty time is linear or in accordance with any other increasing function.

44. The cellular radio network of claim 37, wherein the width of the directional antenna beam is changed in predetermined steps.

45. The cellular radio network of claim 37, wherein the width of the directional antenna beam is changed steplessly.

46. The cellular radio network of claim 37, wherein the width of the directional antenna beam is inversely affected by a distance between the base station system and the subscriber terminal.

47. The cellular radio network of claim 37, wherein the cellular radio network is used in bi-directional radio connections comprising at least one of sporadic and asymmetric traffic.

48. The cellular radio network of claim 47, wherein the cellular radio network is used in connection with packet transmission.

* * * * *